United States Patent [19]

Watkins

[11] Patent Number: 4,758,846
[45] Date of Patent: Jul. 19, 1988

[54] HEAT PEN

[75] Inventor: Richard L. Watkins, Haskell, Okla.

[73] Assignee: Regents for the University of Oklahoma, Norman, Okla.

[21] Appl. No.: 74,729

[22] Filed: Jul. 17, 1987

Related U.S. Application Data

[63] Continuation of Ser. No. 579,581, Feb. 13, 1984, abandoned.

[51] Int. Cl.$^4$ .................. G01D 15/10; H05B 1/00
[52] U.S. Cl. ..................... 346/76 R; 346/139 C; 401/2; 219/237
[58] Field of Search ............ 346/76 R, 139 C; 401/2; 219/230, 237

[56] References Cited

U.S. PATENT DOCUMENTS

| | | | |
|---|---|---|---|
| 2,474,312 | 6/1949 | Halpern | 219/21 |
| 2,955,895 | 10/1960 | Buoymaster et al. | 346/76 R |
| 3,811,030 | 5/1974 | Veach | 219/237 |
| 3,969,025 | 7/1976 | Brodie | 401/2 |
| 3,969,606 | 7/1976 | Veach | 219/237 |
| 4,269,343 | 5/1981 | Siegel et al. | 228/20 |
| 4,328,920 | 5/1982 | Vella | 228/20 |
| 4,435,636 | 3/1984 | Royston | 219/230 |
| 4,439,667 | 3/1984 | Sylvia | 219/230 |

FOREIGN PATENT DOCUMENTS 1114661 5/1968 United Kingdom ............ 346/139 C

OTHER PUBLICATIONS

Drawing of a heated pen assembly, Kenemetrics, Inc., VR-2, 104995B.
Replacement Heat Writing Stylus Model #3197B by Teledyne Geotech of Dallas, Texas.
Brochure "MEQ-800 Microearthquake System", by Sprengnether Instruments, Inc., undated.
Brochure "Portacorder", Model RV-320, by Teledyne Geotech of Dallas, Texas, undated, and Price List dated Mar. 1, 1983 (D).
Brochure "Helicorder", Model RV-301B, by Teledyne Geotech of Dallas, Texas, Aug. 1978//A-0593, Helicorder & Accessories, Aug. 1978/1363 and Price List dated Mar. 1, 1983.

Primary Examiner—George H. Miller, Jr.
Attorney, Agent, or Firm—Dunlap, Codding & Peterson

[57] ABSTRACT

A heat pen comprising a first tube, a holder tube coiled with resistance wire and a metallic cylinder as a stylus. When the resistance wire is charged with electricity the metallic cylinder is heated to mark heat-sensitive recording paper. When the metallic cylinder is worn down by extensive usage, it is readily removed and replaced by a fresh metallic cylinder.

20 Claims, 1 Drawing Sheet

U.S. Patent
Jul. 19, 1988
4,758,846
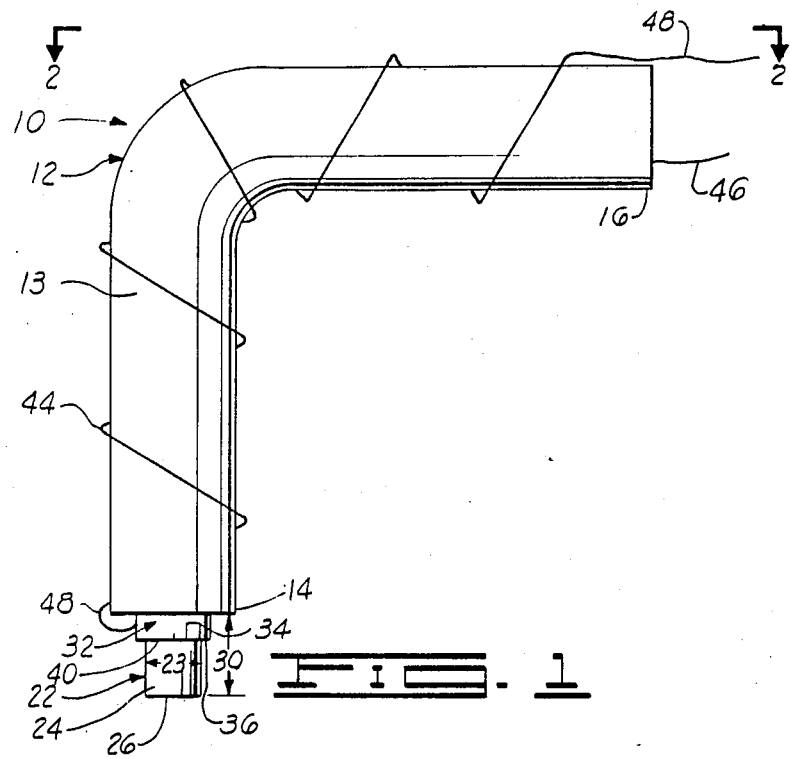
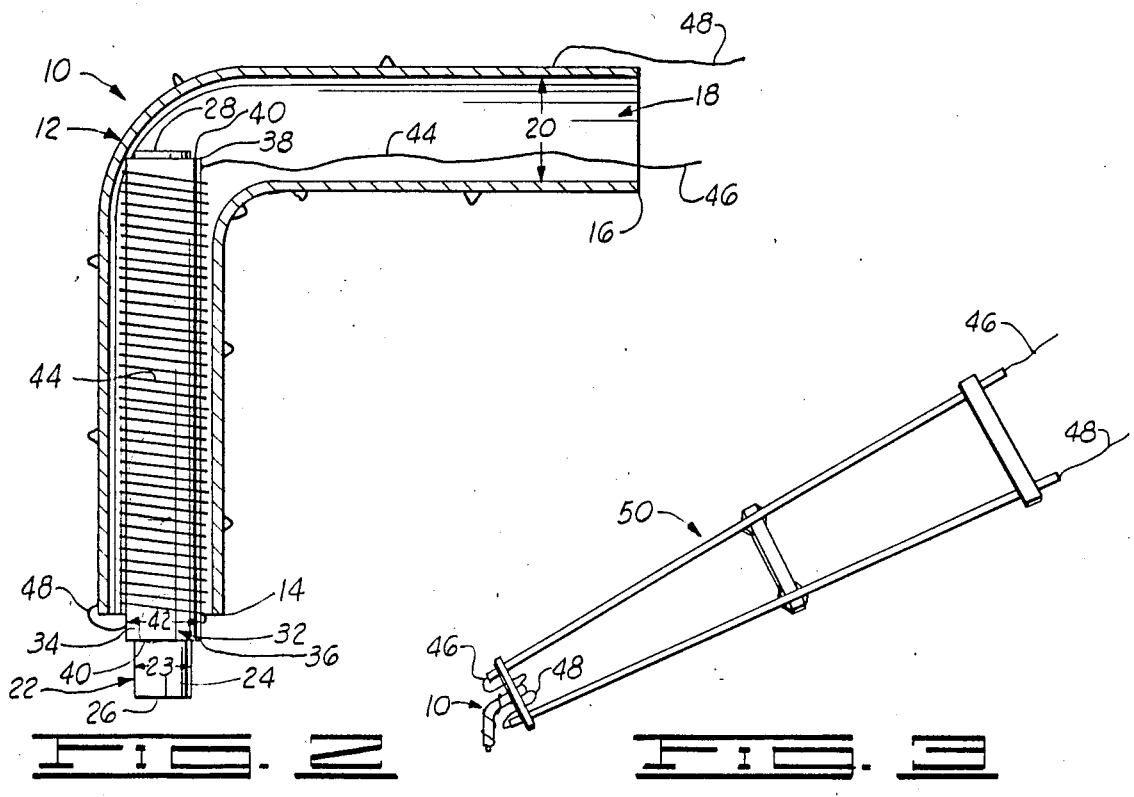

HEAT PEN

This application is a continuation, of application Ser. No. 579,581 filed Feb. 13, 1984 now abandoned and entitled HEAT PEN.

BACKGROUND OF THE INVENTION

Heat pens in recent years have become useful in many fields such as medicine and seismology which require a high speed recording of data for immediate or later analysis. Since the advent of thermally sensitive recording paper, recording instruments need no longer depend upon a supply of ink. Heat pens generally comprise a heated stylus which, when contacting thermally sensitive recording paper, leaves a permanent visual mark. Heat pens, however, even though not dependent on a supply of ink, also are subject to wear and malfunction. Such malfunction may result from the frictional erosion of the heat pen stylus after contacting extensive lengths of recording paper. Heat pens generally available at the present require complete replacement when their stylus has been sufficiently eroded.

The present invention concerns a heat pen with a readily replaceable stylus. Utilizing the heat pen of the present invention, when frictional erosion has caused the stylus to become unsatisfactory, the eroded stylus may be readily replaced without installation of an entire new heat pen.

SUMMARY OF THE INVENTION

A heat pen which comprises a first tube, a metallic cylinder and means for heating the metallic cylinder. The first tube has an outside surface, a first end, a second end and a bore intersecting at least the first end and having a bore diameter. The metallic cylinder has a first end, a second end and a peripheral surface. The diameter of the metallic cylinder is less than the bore diameter of the first tube. The metallic cylinder is removably mounted within the bore of the first tube so that the first end of the metallic cylinder protrudes a predetermined distance from the first end of the first tube.

BRIEF DESCRIPTION OF THE DRAWINGS

FIG. 1 is a side elevational view of a heat pen of the present invention.

FIG. 2 is a side partial cutaway view of a heat pen of the present invention.

FIG. 3 is a perspective view of a heat pen of the present invention mounted as in a high speed recorder.

DETAILED DESCRIPTION OF THE PREFERRED EMBODIMENT

Referring to the drawings in general, particularly FIG. 1 and FIG. 2, reference numeral 10 generally designates the heat pen constructed in accordance with the present invention. The heat pen 10 comprises a first tube 12 which has an outside surface 13, a first end 14, a second end 16 and a bore 18 intersecting both ends 14, 16 of the first tube 12. The bore 18 has a bore diameter 20. Although in the preferred embodiment of the heat pen 10 the first tube 12 is bent at about a right angle, the first tube 12 could have a linear configuration, particularly if the bore intersected the first end 14 only. Although any relatively rigid and heat resistant material such as ceramic or glass could be used to form the first tube 12, a metal such as steel or aluminum, for example, is preferred because of its durability, heat resistance and minimal weight. In a model of the heat pen 10 constructed and tested, the first tube 12 was a stainless steel tubing having an outer diameter of about 0.05 inches and a bore diameter 20 of about 0.032 inches and a total length of about 0.750 inches.

A metallic cylinder 22 having a peripheral surface 24, a first end 26 and a second end 28 is removably within the bore 18 of the first tube 12 so that the first end 26 of the metallic cylinder 22 protrudes a predetermined distance 30 from the first end 14 of the first tube 12. The metallic cylinder 22 has a diameter 23 less than the bore diameter 20 of the first tube 12. In a model of the heat pen 10 constructed and tested, the metallic cylinder 22 was a steel piano wire having a length of about 0.320 inches and a diameter of about 0.009 inches.

The heat pen 10 preferably includes a holder tube 32. The holder tube 32 has an outside surface 34, a first end 36, a second end 38 and a bore 40 intersecting the first end 36 and the second end 38. The bore 40 of the holder tube 32 has a diameter (not shown) greater than the diameter 23 of the metallic cylinder 22. The outer diameter 42 of the holder tube 32 is less than the bore diameter 20 of the first tube 12. The holder tube 32 is preferably constructed of a metal such as steel although any thermally conductive and thermally stable material, including ceramics, may be utilized. In a model of the heat pen 10 constructed and tested, the holder tube 32 was a stainless steel tubing having an outer diameter of about 0.020 inches and a length of about 0.285 inch.

As shown in FIG. 1 and FIG. 2, the metallic cylinder 22 is removably mounted within the bore 18 of the first tube 12 and serves as a heat pen 10 stylus. The metallic cylinder is preferably constructed of a thermally conductive and erosion resistant metal such as high carbon steel. The removably mounting of the metallic cylinder 22 in the first tube 12 preferably involves the holder tube 32. A means for heating the metallic cylinder to produce an activated heat pen 10 stylus preferably involves a resistance wire 44 having two ends, each end connected to a source (not shown) of electricity, preferably direct current. An early step in the construction of the preferred embodiment of the heat pen 10 is the coiling of a resistance wire 44 such as 40 gauge Evanohn wire with 81.43 ohms/foot (Amax Special Metal Corp., Orangeburg, S.C.) around the outside surface 34 of the holder tube 32, for example, about sixty turns on the 0.285 inch holder tube 32. The resistance wire 44 may alternatively be coiled about the outside surface 13 of the first tube 12 when a holder tube 32 is not utilized and the metallic cylinder 22 is treated with thermal grease and mounted directly in the bore 18 of the first tube 12. Before or during the coiling of the resistance wire 44 about the first tube 12 or the holder tube 32, it is electrically insulated by treatment with a thermally conductive electrical insulation such as sodium silicate or water glass, for example, Insulating compound, No. 223-1671, Pot and Ladle Coating Premix (Thiem Corp., Foundry Division, Milwaukee 19, Wis.). When the insulated resistance wire 44 is coiled about the first tube 12 near the first end 14 thereof, a further layering of thermal insulation is advisable to retain heat.

In the preferred embodiment of the heat pen 10, the holder tube 32 with electrically insulated resistance wire 44 coiled about it, is insertively mounted in the bore 18 in the first end 14 of the first tube 12. One end 46 of the resistance wire 44 is led through the bore 18 of the first tube 12 for connection to an electrical source (not shown). The other end 48 of the resistance wire 44 is led around the outside surface 13 of the first tube 12, also for connection to an electrical source (not shown).

The metallic cylinder 22 is next substantially coated with a thermally conductive grease such as Thermal Compound (Wakefield Engineering, Incorp.) and inserted into the bore 40 at the first end 36 of the metallic cylinder. After such insertion the first end 26 of the metallic cylinder protrudes a predetermined distance from the first end 14 of the first tube 12 as well as from the first end 36 of the holder tube 32. A preferred form of metallic cylinder 22 is a high-carbon steel wire with an outer diameter of about 0.009 inches. An inexpensive length of such steel wire is all that needs replacement when the stylus has worn down to an unacceptable length.

As shown in FIG. 3 the assembled heat pen 10 may then be mounted on the pen carriage 50 of a recorder so that the metallic cylinder, acting as stylus, impinges upon the heat sensitive recording paper of the recorder. The ends 46, 48 of the resistance wire 44 are preferably connected to a 150 milliamp D.C. electrical source.

When the resistance wire 44 is charged with electricity, in a fraction of a minute the metallic cylinder 22 is heated to at least about 400° F. and recording may begin. When particularly high velocity recordings, the amount of electricity supplied to the resistance wire 44 may be manually or automatically increased to ensure adequate marking on the heat sensitive paper. A heat sensitive paper such as Geotech 3790 Thermal Paper *Variation* (Graphic Controls Corp., 1303 Clear Springs Trace, Suite 207, Louisville, Ky. 40223) is preferred for recording with the heat pen 10. After extensive periods of recording, the metallic cylinder 22 may erode because of rubbing on the paper and may be readily removed and replaced with a fresh metallic cylinder.

Changes may be made in the construction, operation and arrangement of the various parts, elements, steps and procedures described herein without departing from the concept and scope of the invention as defined in the following claims.

What is claim is:

1. A heat pen for contacting thermally sensitive recording paper on a recorder and leaving a permanent visual mark on the paper comprising:
    a first tube having an outside surface, a first end, a second end and a bore intersecting the first end and the second end, said bore having a bore diameter;
    a metallic cylinder heat pen stylus having a peripheral surface, a first end, a second end and a diameter less than the bore diameter of the first tube, said metallic cylinder being removably mounted within the bore of the first tube so that the first end of the metallic cylinder protrudes a predetermined distance from the first end of the first tube;
    means for heating the metallic cylinder;
    a holder tube having an outside surface, a first end, a second end, a bore intersecting at least the first end and having a bore diameter, and an outer diameter less than the bore diameter of the first tube, said holder tube being insertively mounted in the bore of the first tube near the first end of the first tube, the bore of the holder tube having a bore diameter greater than the diameter of the metallic cylinder heat pen stylus and the metallic cylinder heat pen stylus being removably mounted in the bore of the holder tube and protruding from the first end of the holder tube; and
    means for supporting the first tube with the metallic heat pen stylus disposed therein over the thermally sensitive paper so that the stylus impinges on the thermally sensitive paper comprising a pen carriage having one end connectable to the recorder and an opposite end portion connected to the first tube.

2. The heat pen of claim 1 wherein the holder tube is defined further as being composed of stainless steel.

3. The heat pen of claim 1 wherein the means for heating the metallic cylinder is defined further as comprising a resistance wire.

4. The heat pen of claim 3 wherein the resistance wire is defined further as having two ends, each end being connected to a source of electricity.

5. The heat pen of claim 4 wherein the electricity is defined further as being direct current.

6. The heat pen of claim 4 wherein the resistance wire is defined further as being electrically and thermally insulated and as being coiled about the outside surface of the first tube near the first end thereof.

7. The heat pen of claim 3 wherein the resistance wire is defined further as being electrically insulated and as being coiled about the outside surface of the holder tube.

8. The heat pen of claim 7 wherein the resistance wire is defined further as being electrically insulated with sodium silicate.

9. The heat pen of claim 1 wherein the peripheral surface of the metallic cylinder is defined further as being substantially coated with a thermally conductive grease.

10. The heat pen of claim 1 wherein the metallic cylinder is defined further as being a high carbon steel.

11. The heat pen of claim 1 wherein the first tube is defined further as being metallic.

12. The heat pen of claim 1 wherein the thermally sensitive recording paper is a continuous strip or roll of thermally sensitive recording paper.

13. A heat pen for contacting thermally sensitive recording paper on a recorder and leaving a permanent visual mark on the paper comprising;
    a first tube having an outside surface, a first end, a second end and a bore intersecting the first end and the second end, said bore having a bore diameter;
    a metallic cylinder heat pen stylus having a peripheral surface, a first end, a second end and a diameter less than the bore diameter of the first tube, said metallic cylinder being mounted within the bore of the first tube so that the first end of the metallic cylinder protrudes a predetermined distance from the first end of the first tube;
    means for heating the metallic cylinder heat pen stylus comprising a resistance wire wherein the resistance wire is electrically insulated or electrically and thermally insulated and is coiled about the outside surface of the first tube near the first end thereof; and
    means for supporting the first tube with the metallic cylinder heat pen stylus disposed therein over the heat sensitive paper so that the stylus impinges on the heat sensitive paper comprising a pen carriage having one end connectable to the recorder and an opposite end portion connected to the first tube.

14. The heat pen of claim 13 wherein the thermally sensitive recording paper is a continuous strip or roll of paper.

15. The heat pen of claim 13 wherein the resistance wire has two ends and each end is connectable to a source of electricity.

16. The heat pen of claim 15 wherein the electricity is defined further as being directed current.

17. The heat pen of claim 13 wherein the resistance wire is defined further as being electrically insulated with sodium silicate.

18. The heat pen of claim 13 wherein the peripheral surface of the metallic cylinder is defined further as being substantially coated with a thermally conductive grease.

19. The heat pen of claim 13 wherein the metallic cylinder is defined further as being a high carbon steel.

20. The heat pen of claim 13 wherein the first tube is defined further as being metallic.

* * * * *